United States Patent [19]
Byers et al.

[11] Patent Number: 5,917,815
[45] Date of Patent: Jun. 29, 1999

[54] METHOD AND APPARATUS FOR CONVERTING SYNCHRONOUS NARROWBAND SIGNALS INTO A SONET VIRTUAL TRIBUTARY GROUP FOR COMBINING WITH BROADBAND ASYNCHRONOUS TRANSFER MODE SIGNALS IN AN INTEGRATED TELECOMMUNICATIONS NETWORK

[75] Inventors: Charles Calvin Byers, Aurora; James Philip Runyon, Wheaton, both of Ill.; John Tardy, Somerville, N.J.

[73] Assignee: Lucent Technologies Inc., Murray Hill, N.J.

[21] Appl. No.: 08/581,232

[22] Filed: Dec. 29, 1995

[51] Int. Cl.$^6$ .................................................. H04J 3/02
[52] U.S. Cl. ........................ 370/352; 370/395; 370/466
[58] Field of Search .................................. 370/395, 396, 370/397, 358, 465–467, 498, 510, 458, 538, 539, 487, 490, 352, 907; 455/6.1

[56] References Cited

U.S. PATENT DOCUMENTS

| | | |
|---|---|---|
| 5,172,413 | 12/1992 | Bradley et al. . |
| 5,341,376 | 8/1994 | Yamashita ................................. 370/466 |
| 5,345,445 | 9/1994 | Hiller et al. ............................... 370/465 |
| 5,387,927 | 2/1995 | Look et al. ................................ 370/395 |
| 5,452,306 | 9/1995 | Turudic et al. ........................... 370/465 |
| 5,471,476 | 11/1995 | Hiramoto ................................. 370/907 |
| 5,623,491 | 4/1997 | Skoog ...................................... 370/404 |
| 5,640,387 | 6/1997 | Takahashi et al. ....................... 370/467 |

*Primary Examiner*—Chau Nguyen

[57] ABSTRACT

In the network of the invention, telephony and other narrow band services are provided using twisted pairs via existing fiber-in-the-loop (FITL) technology while the analog video and digital broadcast video are carried over a single coaxial cable to the customer premise. All customer subscriber lines are moved out of the central office and are distributed in the outside distribution plant via FITL technology. Data and digital video from the central office are distributed to a large number of field located optical network units (ONU) as ATM signals over optical fibers. The narrowband signals are converted to a SONET virtual tributary group and are combined with the digital video signals for delivery to the home.

28 Claims, 6 Drawing Sheets

METHOD AND APPARATUS FOR CONVERTING SYNCHRONOUS NARROWBAND SIGNALS INTO A SONET VIRTUAL TRIBUTARY GROUP FOR COMBINING WITH BROADBAND ASYNCHRONOUS TRANSFER MODE SIGNALS IN AN INTEGRATED TELECOMMUNICATIONS NETWORK

BACKGROUND OF THE INVENTION

The invention relates, generally, to telecommunications systems and, more particularly, to an integrated network for providing narrowband services such as telephony, and broadband services such as digital video, analog video, and ATM data.

It will be appreciated that telephony services presently are provided over a narrowband network that is designed to provide voice to the home. A separate analog video service network, such as a cable television network, provides analog video service to the home. Moreover, both telephony service providers providers and cable television service providers are introducing broadband technologies such as asynchronous transfer mode (ATM) services in their respective networks to provide video or other broadband services. It is possible that ultimately these networks may become redundant insofar as some of the services they provide; however, it is likely that some services will remain the prime domain of one or the other of the networks such that a consumer that desires all of these services would be required to subscribe to a plurality of networks. From the consumer's perspective, the need to deal with two or more separate network operators is inconvenient and confusing. Moreover, because the networks are developing independently, it is also likely that different architectures and protocols may ultimately evolve. As a result, the cost of maintenance, implementation and expansion of services on two or more separate networks will be higher than if a single integrated network is developed, and this cost ultimately will be passed to the consumer.

It would be advantageous if both broadband and narrowband services could be provided to the home over a single network. The integration of these various services into a single network would provide a simpler and more user friendly network for customer interface. Moreover, the cost for implementation, maintenance and expansion for a single integrated network would be less than for a plurality of independent networks each providing some, but not all, of the desired services. These savings could be passed on to the consumer resulting in lower total cost for the services to the customer. Finally, the use of a single integrated network would provide a consistent quality standard and facilitate the standardization of premise equipment and other network interfaces.

One problem in the development of such a network is the need for an effective and economical mechanism for converting a standard interface, e.g. TR-303, provided by standard synchronous time division multiplexing digital signal carrier DS 1 s/E1s from the voice switched network into a virtual tributary group for transmission to the field elements.

SUMMARY OF THE INVENTION

In the network of the invention, telephony and other narrowband services are provided using twisted pairs via existing fiber-in-the-loop (FITL) technology while the analog video and digital broadcast video/data are carried over a single coaxial cable to the customer premise. In a significant change from existing telecommunications networks, all customer subscriber lines are moved out of the central office and are distributed in the outside distribution plant via FITL technology. Telephone and digital video from the central office are distributed to a large number of field located optical network units (ONU) as ATM signals over optical fibers. Specifically, the narrowband signals are encapsulated in SONET virtual tributaries such that they can be combined with switched digital video and digital broadcast video/data for delivery to the home. Analog video is transmitted to the ONUs over a separate frequency spectrum on coaxial cable. The ONUs are connected to a network interface device (NID) at the customer premise by a combination of twisted pair and coaxial cable. ATM technology is also used to carry the signaling and digital video and data throughout the network. The network of the invention supports narrowband services including analog telephony, integrated services digital network (ISDN), and the like; broadband services including analog video channels and ATM data streams for the unidirectional, uninterrupted transport of ATM formatted digital signals, and on-demand bidirectional digital data streams; and switched digital data streams such as "on demand" digital data, video telephony and video on demand and digital broadcast video.

DETAILED DESCRIPTION

Figure 1:
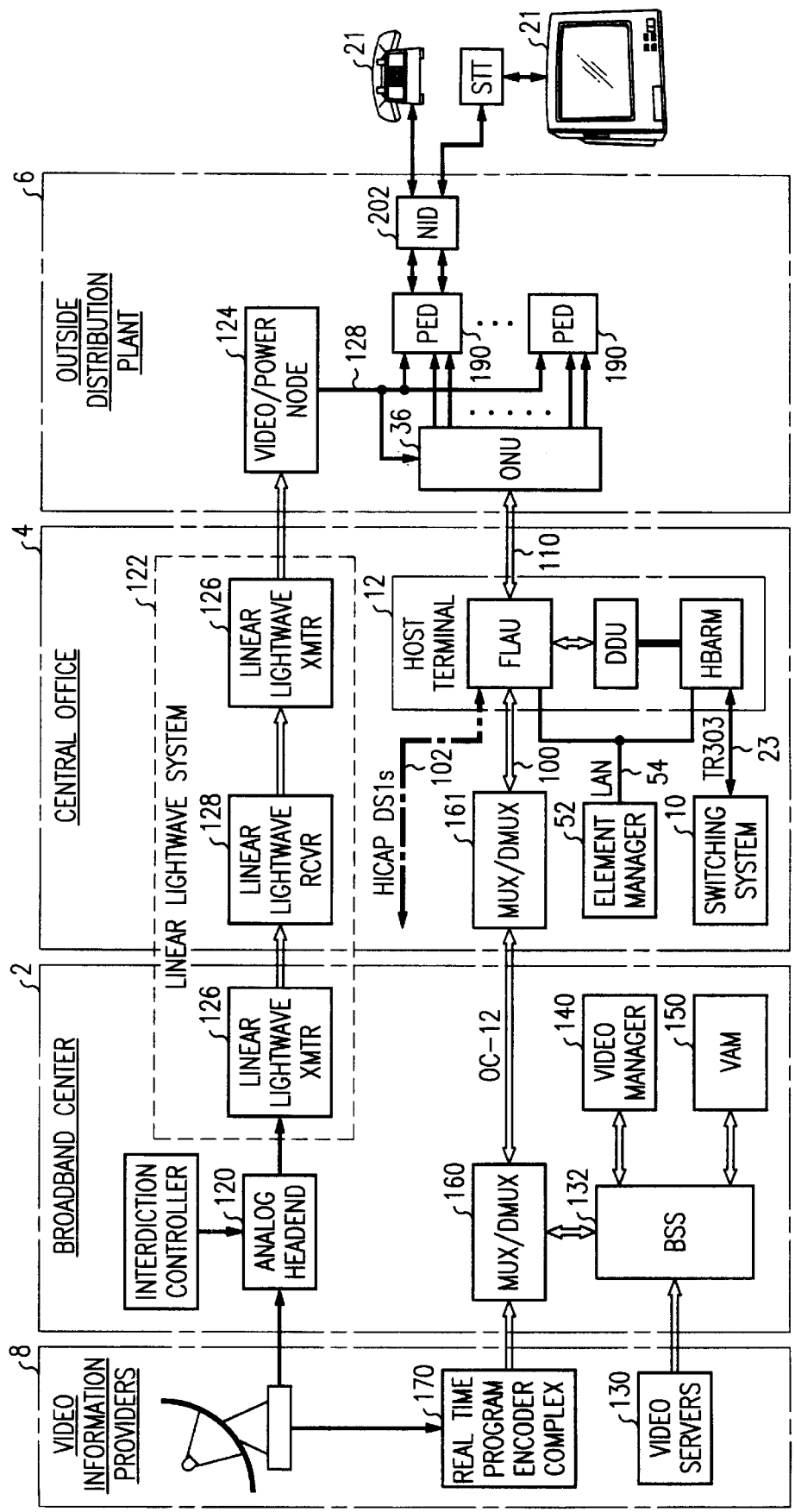
FIG. 1 is a block diagram showing a broadband network.

Referring more particularly to FIG. 1, the overall architecture of the network of the invention is illustrated. Generally, the architecture comprises three interelated component areas—the broadband center 2, the central office 4 and the outside distribution plant 6. The broadband center 2 includes those elements that select, control and administer digital broadcast services and provides an interface between the video information providers (VIPs) 8 and the network. The central office 4 includes those elements for switching the telephony and digital video and data signals from the source of the signals (i.e. the broadband center for video signals and other switches in the network for the telephony and data signals) to the outside distribution plant 6. The outside distribution plant 6 includes those elements for transmitting the video, data and telephony signals to the customer premise equipment (CPE) 21 such as telephones, multimedia equipment, personal computers, terminals or the like. The individual elements of the network architecture will be described in relation to the major service categories provided by the network-telephony, analog broadcast video, and digital video.

Telephony

Figure 2:
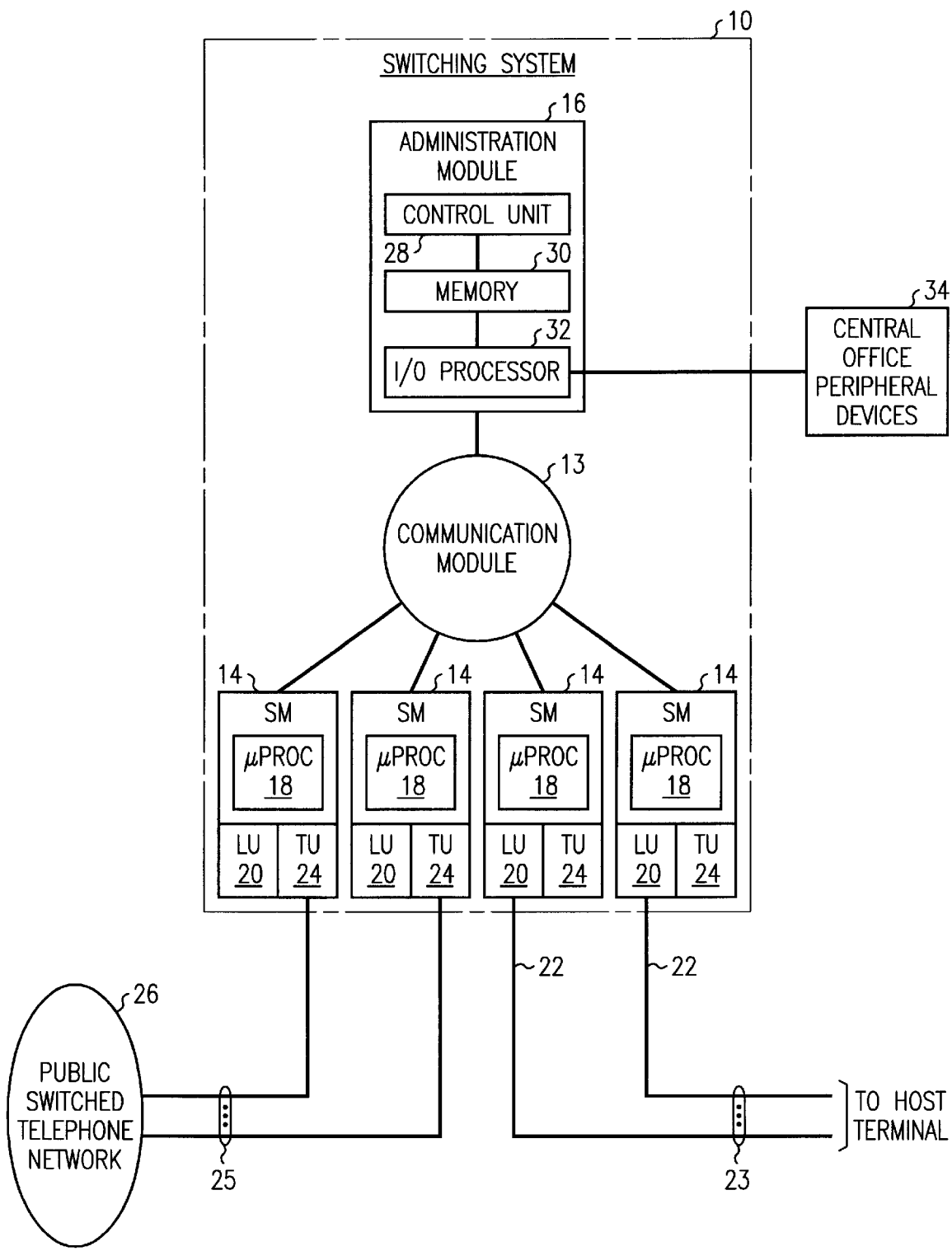
FIG. 2 is a block diagram of the switching system of the network of FIG. 1.

The narrowband telephony architecture consists of two major central office elements: a switching system 10, and a host terminal 12. Switching system 10 provides narrowband telephony call processing and can consist of the 5ESS® switch manufactured and sold by AT&T and described in U.S. Pat. No. 4,592,048 issued to Beckner et al. on May 27, 1986 and in *AT&T Technical Journal*, Vol. 64, No. 6, Part 2, pp. 1305–1564, or other similar switching systems. Switching system 10 operates as is well known in the art to switch telephony signals through the network. The architecture of such a switching system is shown in greater detail in FIG. 2 and includes a communication module 13 forming a hub and having a plurality of switch modules (SM) 14, and an administration module 16 emanating therefrom. Each switch module 14 is controlled by microprocessor 18 and provides call processing, time division switching, and signaling for the lines and trunks to which it is connected. Line units 20 provide interface to synchronous time division multiplexing digital signal carriers DS1s 22 that comprise a standard TR-303 interface 23 and connect to the host terminal 12 (shown in FIGS. 1 and 3). Trunk units 24 provide interface to the trunks 25 that connect to other switches in the public switched network 26. The administration module 16 provides functions that can be centralized such as maintenance control, craft interface, text and data base management, and time slot allocation. The administration module 16 consists of a control unit such as the AT&T 3B21D duplex processor 28 and main store memory 30. In some switching systems, the administration module is assisted by a separate processor that performs some administrative functions. The administration module 16 also includes an input/output processor 32 providing communication between the switching system 10 and peripheral devices 34 such as terminals, printers and the like. Communication module 13 is the hub of the switching system and allows communication between the administration module 12 and the switch modules 14. Communication module 13 consists of a message switch that provides the administration module-to-switch module, and switch module-to-switch module message communication and a time multiplexed switch providing the switch module-to-switch module and switch module-to-administration module time slot connection for voice and data communication and the clock distribution.

Figure 3:
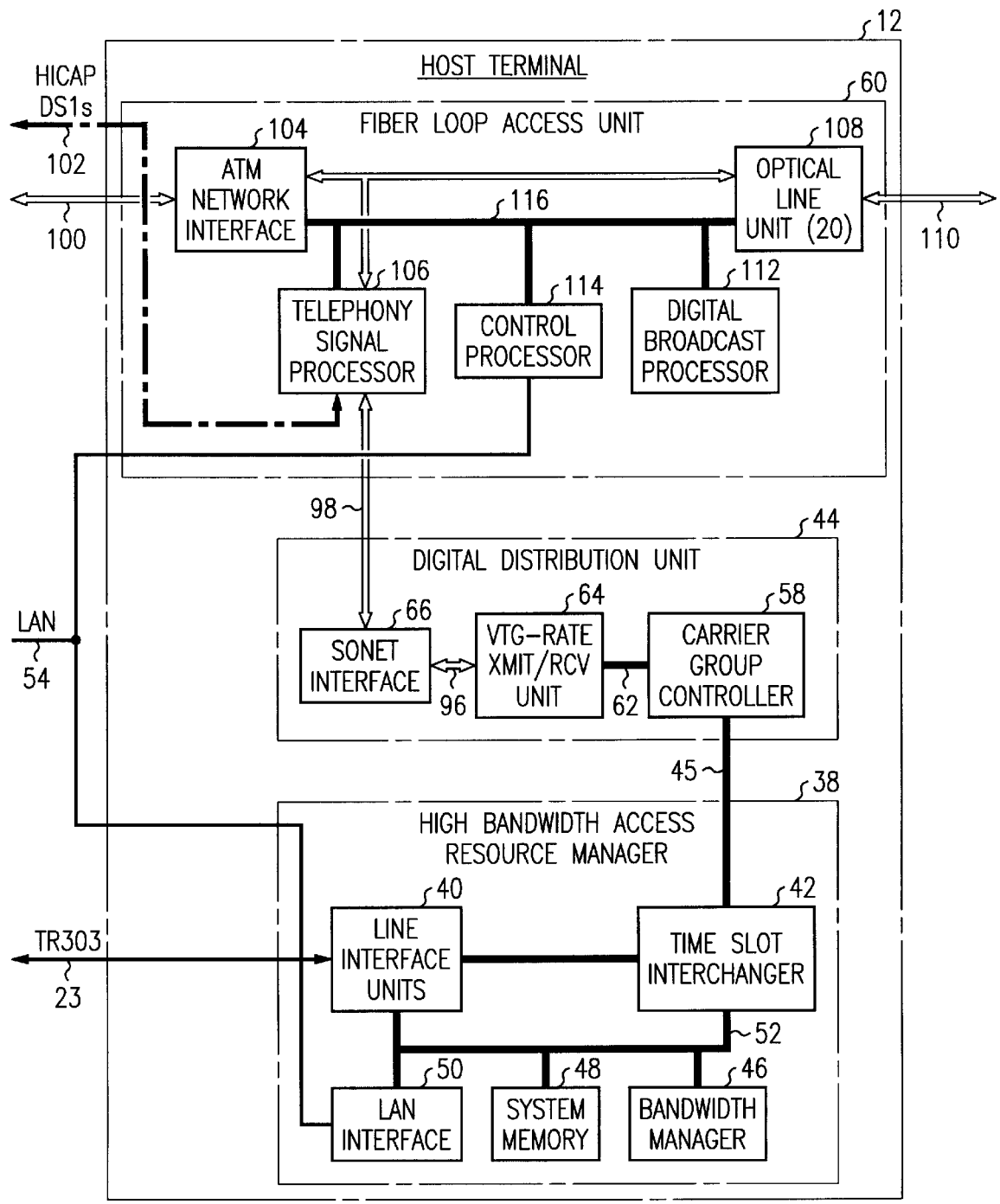
FIG. 3 is a block diagram of the host switched digital video terminal found in the network of FIG. 1.

Referring to FIGS. 1 and 3, switching system 10 interfaces with host terminal 12 over a standard Bellcore TR-303 interface 23. The TR-303 interface 23 is physically provided by standard synchronous time division multiplexing digital signal carrier DS1s. In the preferred embodiment, between two and fifty-six DS1s, divided into one or more virtual remote terminals, are used where no concentration is provided in the switching system. It will be appreciated that the actual number of DS1s used will depend upon the aggregate end-to-end traffic levels during peak intervals and the desired blocking probability.

Host terminal 12 is a central office element serving as the integration point for all of the narrowband telephony and broadband digital signals destined for the CPEs 21. The main function of host terminal 12 is to adapt the digital signals from switching system 10 and the broadband center 2 to the format required by the broadband ONUs 36. Host terminal 12 also performs concentration of the telephony channels delivered to the ONUs.

Host terminal 12 is shown in detail in FIG. 3 and consists of a high bandwidth access resource manager (HBARM) 38. The HBARM 38 terminates the links of the TR-303 interface 23 from the switching system 10. Specifically, HBARM 38 consists of line interface units 40 that connect the individual DS1 links of the TR-303 interface 23 to a time slot interchanger 42 that, in turn, transmits and receives telephony signals to and from the digital distribution unit 44 over bus 45. The time slot interchanger 42 crossconnects feeder time slots from the links of the TR-303 interface 23 to distribution time slots on bus 45 in four equal groups of time slots where one of the four groups of time slots is connected to one of four distribution units 44. While only one digital distribution unit 44 is illustrated, it will be appreciated that up to four digital distribution units may be used, one communicating with each of the four groups of time slots from the time slot interchanger 42. The line interface unit 40 and time slot interchanger 42 communicate with bandwidth manager 46, system memory 48 and LAN interface 50 over bus 52. Bandwidth manager 46 controls the time slot interchanger 42 based on input from system memory 48. LAN interface 50 is connected to the element manager 52 (FIG. 1) over LAN 54 to remotely control the HBARM 38.

The digital distribution unit 44 of the invention receives the telephony signals from the time slot interchanger 42 of the HBARM 38 over bus 45 and converts these synchronous signals to a SONET signal for delivery to the fiber loop access unit 60. The digital distribution unit 44 reverses this process for signals traveling from the fiber loop access unit 60 to the HBARM 38. Digital distribution unit 44 consists of a carrier group controller 58 that collects system bandwidth and converts it onto a synchronous parallel time slot bus 62 that is connected to VTG-rate transmit/receive units (VTRUS) 64. Up to 21 VIRUS per digital distribution unit may be used. Time slot bus 62 consists of 768 16-bit time slots. The carrier group controller 58 also maintains a time slot bus to ONU time slot map in each VTRU 64 and assigns the time slots on a first come, first serve basis. The VTRU 64 processes the signals and delivers the signals to SONET interface 66 as will hereinafter be described.

Figure 4:
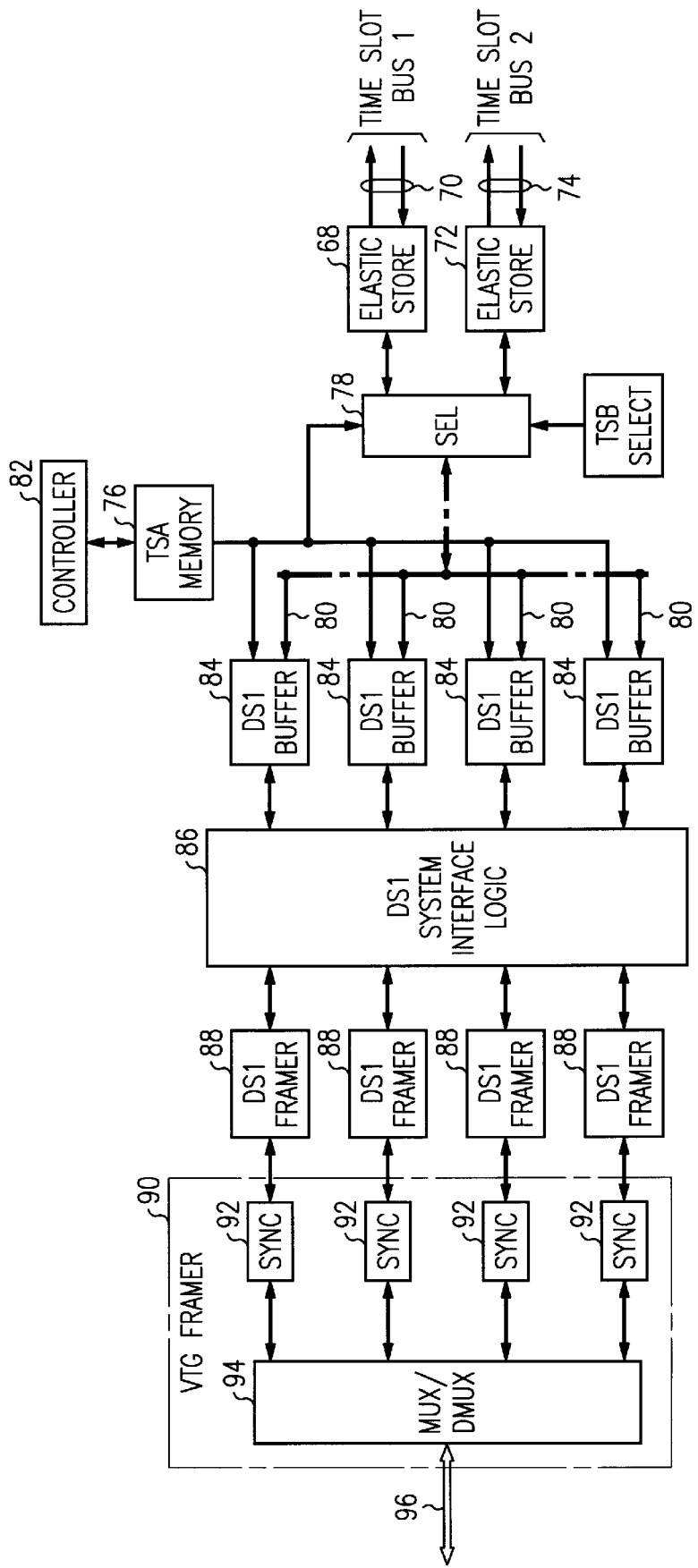
FIG. 4 is a block diagram of the VTG rate transmit/receive unit (VTRU) of the network of FIG. 1.

Referring to FIG. 4, VTRU 64 is shown consisting of an elastic store 68 for transmitting and receiving signals to and from time slot bus 70. A second elastic store 72 for transmitting and receiving signals to and from a second time slot bus 74 can be provided for reliability. It is to be understood that time slot bus 70 and time slot bus 74 comprise the synchronous parallel time slot bus 62 described generally with reference to FIG. 3. A time slot assignment (TSA) memory 76, comprising a dual port RAM, maps any of the 768 16-bit time slots from the time slot buses 70 and 74 to any channel in one of the four DS1 data streams 80. Specifically, selector 78 is controlled such that one byte of data from the 768 16-bit time slots on the time slot buses 70 and 74 are taken to populate the 96 8-bit time slots of the four downstream DS1 data streams 80 according to the maps in memory 76 as set up by carrier group controller 58 (FIG. 3). A control link embedded in the time slot bus allows the carrier group controller 58 access to the VTRU to manage the memory 76 and controller 82. Any idle time slots not having an assignment are populated with idle code.

Signaling buffers 84 buffer the messages destined for the ONUs 36 and make any necessary translations into the corresponding proprietary message for the ONU data links. The data is also formatted into the ANSI T1 DS1 format. The DS1 system interface logic 86 controls the serial steams for the system interface to the four DS1 framers 88. Each serial stream includes 24 time slots from the DS1 buffers 84 and eight time slots containing idle code. Each of the four serial streams from DS1 system interface 86 are delivered to the DS1 framers 88 such as the 1000BS DS1 transceiver chip manufactured and sold by AT&T. The DS1 framers 58 extract and insert a facility data link into each DS1 used for ONU control. The framers also extract and buffer robbed-bit signaling from each DS1 and insert subscriber data transmitted in a time slot on the time slot bus into each DS1 in extended super frame formal (ESF) as defined in Bellcore TR-NWT-000499 "Transport System Service Requirements (TSGR): Common Requirements."

The formatted DS1 signals are then transmitted to a virtual tributary group (VTG) framer 90 that can consist of an AT&T Vital® chip or other similar device. The VTG framer 90 includes synchronizers 92 for framing the ESF DS1 signal relative to the system clock and a multiplexer/demultiplexer 94 for formatting the four DS1 signals into a SONET VTG signal. The resulting SONET VTG signal 96 is a component of a SONET OC-3 that can be combined with the broadband digital signals in fiber loop access unit 60. It will be appreciated that this process is reversed for data flowing from the ONUs to switching system 11.

Referring again to FIG. 3, the fiber loop access unit 60 combines the OC-3 signals received from the digital distribution unit 44 via SONET interface 66 over optical link 98 with the digital video programming from video trunks 100, and HICAP DS1 signals received over the HICAP trunks 102, and formats them for transmission to the ONUs 36. It will be appreciated that HICAP DS1 signals consist of 84 DS1s. In the illustrated embodiment, the fiber loop access unit 60 can consist of FLX Shelf manufactured and sold by BroadBand Technologies, Inc., of Research Triangle Park, N.C. The fiber loop access unit 60 includes an ATM network interface 104 for interfacing with the optical trunks 100 carrying the SDV and digital broadcast signals and ATM data from broadband center 2. A telephony signal processor 106 receives the telephone signals from the digital distribution unit 44. The signals from the telephony signal processor 106 and ATM network interface 104 are formatted and combined and are delivered to optical line units 108 for subsequent delivery to the ONUs 36 over optical links 110. The fiber loop access unit 60 further includes a digital broadcast processor 112 for management of digital broadcast channel changes and data bases and a control processor 114 for overall management of fiber access loop unit 60. The digital broadcast processor 112 and the control processor 114 communicate with the ATM network interface 104, optical line unit 108 and telephony signal processor 106 over bus 116. Control processor 64 also communicates with LAN 54 such that the fiber loop access unit 60 can be remotely controlled by element manager 52.

Analog Broadcast Video

The analog broadcast video architecture is designed to carry 77 channels with a bandwidth of 54–550 MHz. The architecture uses two stages of analog fiber distribution with the final link to the customer over coaxial cable. Referring to FIG. 1, the analog video headend 120 is typically located within a metropolitan serving area. The headend 120, as will be appreciated, receives analog video signals from video information providers 8 and routes and distributes this programming to the network. These signals are modulated on a per channel basis, via AM-VSB channels in the 54 to 550 MHz frequency range and combined for transmission on analog fiber/coaxial distribution network.

The linear lightwave system, shown generally at 122 in FIG. 1, optically transports an ensemble of electrical RF channels from the analog headend 120 to the video/power node 124 in the outside distribution plant 6. The linear lightwave system 122 consists of up to three fiber supertrunks where the RF band is split across the three fibers. The supertrunk transmitters 126 consist of up to three linear lightwave transmitters driving the three fibers. The supertrunk receiver 128 in each central office consists of up to three linear lightwave receivers and a combining filter. The filter takes the receiver outputs (each containing part of the RF bandwidth) and filters and combines them into a single electrical signal containing the entire bandwidth. The combined signal can then be split to send the signal containing the entire bandwidth to a plurality of video/power nodes 124 by lightwave transmitter 126. According to engineering rules based on the optical loss of the links, present technology allows the signal to be sent to up to four video/power nodes 124.

Each video/power node 124 includes two subsystems— a power subsystem and a video subsystem. The power subsystem provides power to the ONUs 36 and RF active components. The video subsystem includes a linear lightwave receiver that provides optical to electrical conversion of the signal received from the linear lightwave transmitter 126. The electrical signal feeds to a 1:2 splitter, the outputs of which drive a pair of dual-output launch amplifiers. These amplifiers, in turn, supply up to the 77 AM-VSB channel to four distribution coaxial cables 128. Each coaxial cable is connected to several ONUs 36 to deliver the analog video to the CPE 21. Also, power and analog video are delivered to ONUs 36 over coaxial cable 128.

Digital Video And Data

Digital video transmission consists of two different types— switched digital video and broadcast digital video. Switched digital video (SDV) comprises interactive digital video services such as digital video on demand. A SDV video information provider via video server 130 will provide digital video signals, encapsulated in ATM cells, to the network of the invention for transmission to CPEs. Broadcast digital video (BDV) includes digital video signals compressed with an algorithm such as MPEG-2, ATM formatted programming where an ensemble of channels are packaged and broadcast to all host terminals within a serving area. At the host terminals 12 the digital broadcast signals are routed on an individual basis to each subscriber based on a combination of network-control instruction and end-user requests. In addition to video, digital data can be transmitted from a data source over the network elements to provide a variety of data services to the end user.

Referring more particularly to FIG. 1, the broadband center 2 includes a broadband switching system (BSS) 132 that supports both permanent virtual circuit and switched virtual circuit services. One such switch is the GlobeView™—2000 switch manufactured and sold by AT&T. The BSS 132 has a capacity of up to 160 Gb/s and supports virtual path and virtual channel connections as defined in the ITV-T and ATM Forum broadband standards. The BSS 132 supports a variety of standard user/network interfaces (UNI) and network/network interfaces (NNI) including OC3c, STM-1 and include line cards that are modular hardware components that terminate facilities and provide ATM call processing functions. While a specific ATM switch architecture has been described, it will be appreciated that any ATM switch may be used provided it has the capability to terminate the UNI and NNI interfaces; switch ATM cells; terminate Q.2931 and BISUP signaling channels; set up SVC calls; and provide network management capabilities.

A video manager 140 acts as a subscriber interface to provide subscribers with equal access to video information providers through a signaling path to establish and manage connections. The video manager 140 stores subscriber and video information provider related information and serves as a central repository for this information. It can provide this information to other network elements and information providers, creating a revenue opportunity for the service provider. The video manager also provides billing related measurements such as session counts, usage information or the like. The video administration module (VAM) 150 performs provisioning, administration and support of digital broadcast services among the video information providers, network providers and subscribers.

The OC3 signals from BSS 132 are delivered to a first multiplexer/demultiplexer 160 and to a second multiplexer/demultiplexer 161 where the OC3 input signals are combined into a standard OC-12 SONET data stream. Both multiplexers 160 and 161 can consist of a DDM-2000 manufactured and sold by AT&T or other suitable device. Within the network, the multiplexers 160 and 161 combine and optically transport many SONET STS-3c pipes between the broadband center 2 and central office 4. The STS-3c pipes carry: 1) bidirectional signaling for both switched digital video and digital broadcast video between the BSS ATM switch and the host terminal 12; 2) downstream switched digital video or data from the BSS ATM switch and the host terminal 12; and 3) downstream digital broadcast video from the program encoder packet multiplexers to the host terminal 12 unit. The output of multiplexer 161 is delivered to host terminal 12 over optical trunk 100 as previously described with respect to FIG. 3.

A real-time program encoder 170 is used in the broadband center 2 to produce encoded digital broadcast video channels for distribution to host terminal 12 in central office 4. The program encoder 170 digitizes baseband NTSC (National Television Standards Committee) video and stereo-audio inputs, compresses them into formatted bit streams and performs the ATM adaptation layer functions. The resulting signal is multiplexed with other ATM channels which are then encapsulated as SONET OC-3C signals.

Outside Distribution Plant

Referring to FIG. 1, The ONUs 36 provide the interface between the outside distribution plant 6 and the host terminal 12. Each ONU 36 consists of two electrical subsystems—a narrowband subsystem and a broadband subsystem. The narrowband subsystem provides low speed (i.e. DS0 based) telephony services, and specials such ISDN, coin, party line and the like, over twisted pair drops to the CPE. The broadband subsystem provides the switched digital video services and data on twisted pairs to the tap combiners where the switched digital video signals are combined with analog video onto a single coaxial drop to the CPE. The ONU also contains a physical interface to terminate a coaxial cable which supplies the AMVSB channels and provides 60 VAC, 60 Hz or 90 VAC, 1 Hz to power the ONU.

Figure 5:
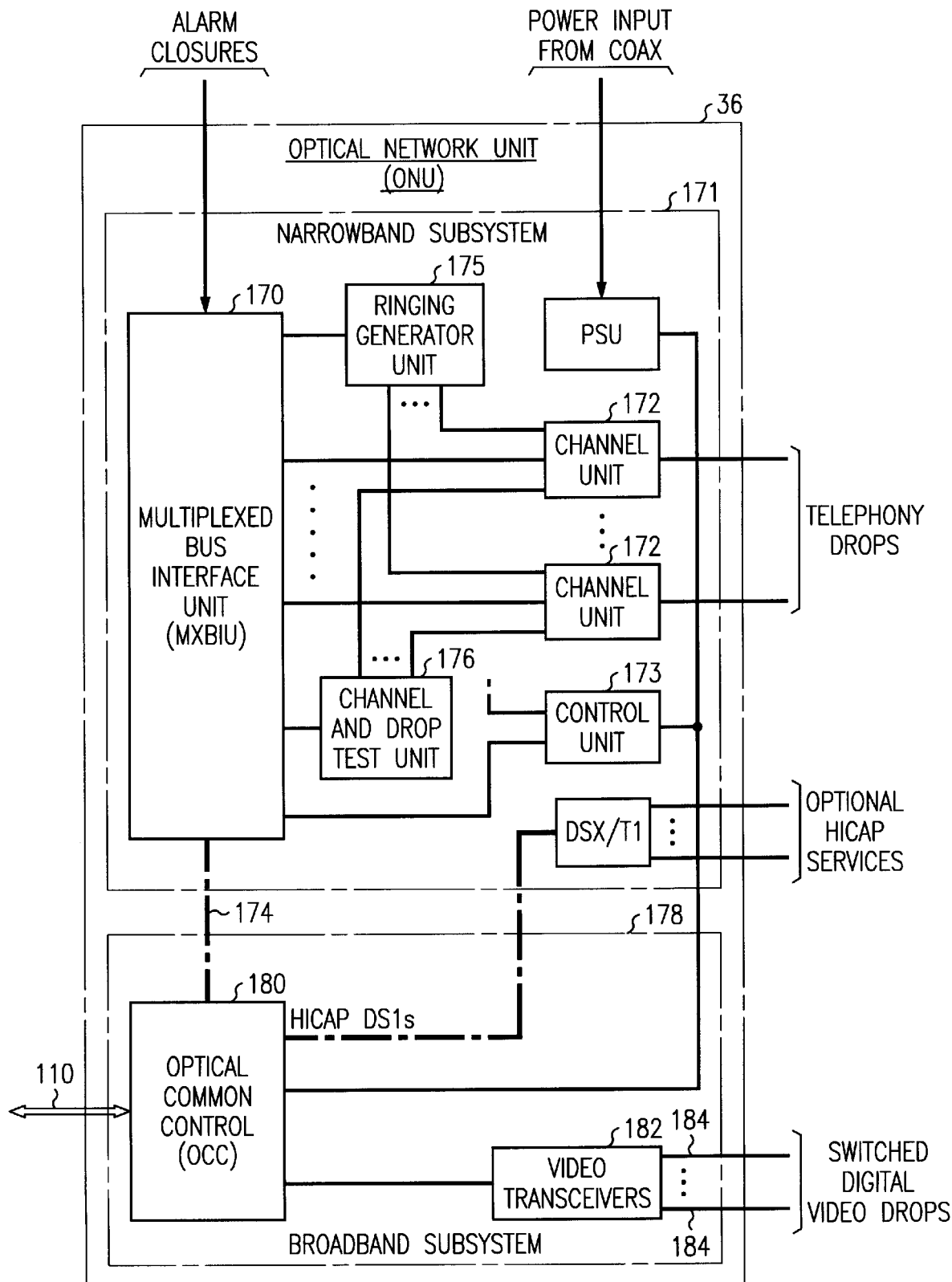
FIG. 5 is a block diagram of the ONU of the network of FIG. 1.

Referring more particularly to FIG. 5, the ONU broadband subsystem 178 consists of an optical common control card 180 and a set of video transceivers 182 that interface to the twisted pairs 184. Such a broadband system can consist of FLX Node from BroadBand Technologies, Inc., of Research Triangle Park, N.C. The broadband system provides the optical interface to the host terminal 12 for both narrowband and broadband service. Moreover, the broadband system routes the telephony information to and from the narrowband subsystem and delivers the SDV to the appropriate twisted pair drivers. The optical common control card 180 interfaces with host terminal 12 over two single-node fibers that terminate on standard optical connectors in the ONU. One fiber carries data from host terminal 12 to the ONU and the other fiber carries data from the ONU to the host terminal 12. The optical common control card 180 demultiplexes the signals from the host terminal 12 and transports the telephony payload to the narrowband subsystem 171 over RS-422 formatted DS1s 174. Specifically, the telephony signals are delivered to a multiplexed bus interface unit (MXBIU) 170.

MXBIU 170 is the interface to the optical transport network linking ONUs 36 to host terminal 12 via OCC 80 for narrowband transmission. The MXBIU 170 also is the interface for operations, administration, maintenance and provisioning functions and controls all controllable functions within the narrowband subsystem via control unit 173 that includes a processor and memory (not shown). The MXBIU 170 interfaces with the optical transport network through one to four DS1 links 174 via serial telephony interfaces using the extended superframe format (ESF). The 24-time slot DS is from host terminal 12 are converted to 32 16-bit time slots. The MXBIU 170 multiplexes the 32 16-bit time slots onto 24 8-bit time slots of the DS1 link, translating the signaling bits into the corresponding bit sequences of the ESF format. The signals from the MXBIU are delivered to channel units 172. Each channel unit 172 delivers the narrowband telephony signaling to the CPE.

The narrowband subsystem also includes a ringing generator unit (RGU) 175 for generating the standard 20 Hz ringing signal required for call alert for analog telephones. A channel and drop test unit (CDTU) 176 can optimally be provided to perform a standard set of channel and drop tests on the two-wire subscriber drops in response to control messages received from the MXBIU.

Figure 6:
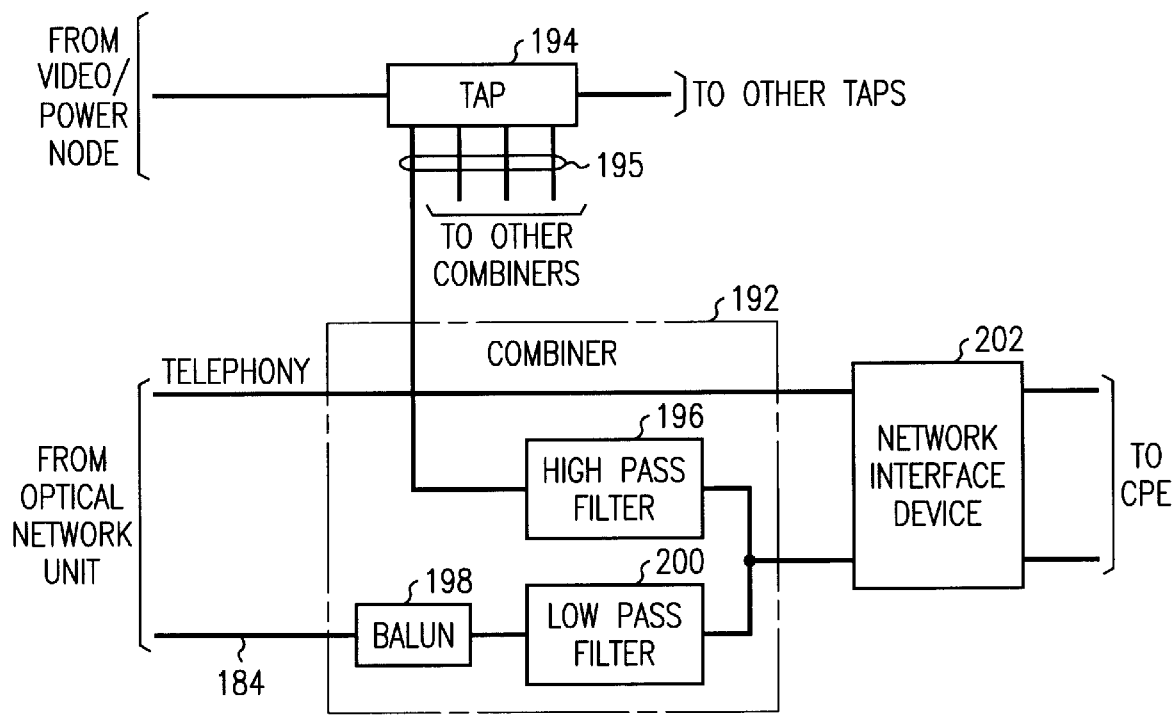
FIG. 6 is a block diagram of the tap combiner of the network of FIG. 1.

The analog video signal from the video/power node 124 and the digital video and telephony signals from the ONU 36 are delivered to a plurality of pedestals 190, shown in FIG. 1. Each pedestal 190 may include a line extender amplifier if needed to provide RF signal amplification and slope equalization to compensate for the loss and frequency roll-off of the cable and taps in the video distribution network between the video/power node and the network interface device (NID) 202. The pedestals 190 also includes a tap/combiner 192 where the analog and digital video signals are combined onto a single drop to the customer premise equipment as shown in FIG. 6. The digital video signal 184 from the ONU is delivered to combiner 192. The analog video signal from the video/power node is delivered to the tap 194 over coaxial cable. The tap 194 takes a given amount of energy from the incoming RF signal and passes the tapped signal to a splitter where it is divided among a plurality of drop ports 195. Each of the signals from each of the drop ports is delivered to a combiner 192.

The combiner 192 combines the bandwidth extracted from the RF analog signal with the digital video signal arriving over the twisted pair from the ONU 12, and delivers the combined signal to the coaxial drop cable. Specifically, the combiner 192 consists of a high pass filter 196 for filtering the RF signal from the tap and delivering the filtered signal to NID 202 over a coaxial drop cable. The combiner further includes a balun 198 for adapting the balanced twisted-pair drop from the ONU to a single-ended signal. The single-ended signal is filtered in a low pass filter 200 before delivering the digital video signal to the coaxial drop. The use of the high pass and low pass filters maintains isolation between the two media. The combined signal from combiner is delivered to NID 202 over the coaxial drop cable.

The telephony twisted pair drop from the ONU is also routed to the NID 202 via the combiner 192. The telephony signal is not combined on the coaxial drop cable. The telephony twisted pair drop and the coaxial drop cable terminate at NID 202. NID is located at the customer premise and includes a station protector for protecting the drops against lightning and electrical surges. The NID also serves as the FCC-required demarcation point between the network and the customer premise equipment.

It is to be understood that the above description is only of one preferred embodiment of the invention. Numerous other arrangements may be devised by one skilled in the art without departing from the scope of the invention. The invention is thus limited only as defined in the accompanying claims.

Invention claimed is:

1. A method for converting synchronous digital signal carriers into a combined asynchronous transfer mode signal and SONET virtual tributary group, comprising the steps of:
    transmitting an asynchronous transfer mode (ATM) digital signal from a sourcce;
    transmitting a plurality of synchronous time slots carrying data;
    converting the synchronous time slots into a SONET virtual tributary group, comprising the steps of:
        a) selecting time slots from either a first or a second bus:
        b) transferring said time slots to one of plurality of DS1 frames based on a time slot map;
        c) formatting the data on the one of a plurality of DS1 frames;
        d) framing the data in desired format; and
        e) multipleing the plurality of DS1 frames onto a SONET virtual tributary group;
    combining the ATM digital signal with the SONET virtual tributary group to create a combined signal; and
    transmitting the combined signal to a customer premise equipment.

2. The method of claim 1, wherein the synchronous time slots are transmitted from a switching system over a plurality of DS0 links.

3. The method of claim 2, wherein said switching system is connected to other switching systems in a public switched network for transmitting voice.

4. The method of claim 1, wherein said step of tranmitting a plurality of time slots includes the step of transmitting 768 16-bit time slots and said step of mapping into a plurality of DS1 frames includes the step of mapping into four DS1 frames having 96 8-bit time slots.

5. The method of claim 1, wherein said step of formatting includes the step of buffering said time slots.

6. The method of claim 1, wherein the step of formatting includes the step of formatting the data into the ANSI T1 DS1 format.

7. The method of claim 1, wherein the step of framing includes the step of framing each DS1 frame in extended superframe format.

8. The method of claim 1, wherein the step of transmitting an asychronous transfer mode (ATM) digital signal from a source includes the step of transmitting an asynchronous transfer mode (ATM) digital video signal and the step of combining the ATM digital signal with the SONET virtual tributary group includes combining the ATM digital signal with the SONET virtual tributary group.

9. The method of claim 1, wherein the step of transmitting an asynchronous transfer mode (ATM) digital signal from a source includes the step of transmitting an asynchronous transfer mode (ATM) digital data signal and the step of combining the ATM digital signal with the SONET virtual tributary group includes combining the ATM digital data signal with the SONET virtual tributary group.

10. the method of claim 1, wherein the step of transmitting an asynchronous transfer mode (ATM) digital signal from a source includes the step of transmitting an asynchronous transfer mode (ATM) digitsl video and data signal and the stpe of combining the ATM digital signal with the SONET virtual tributary group includes combining the ATM digital video and data signal with the SONET virtual tributary group.

11. An intergrated telecommunications network comprising:
    means for transmitting an asynchronous transfer mode (ATM) digital video and/or data signal from a source;
    means for transmitting a plurality of synchronous time slots carrying voice and/or data from a switching system as a public switched network,
    means for converting the synchronous time slots into a SONET virtual tributary group, said means for converting comprising the following elements a, b, c, d and e:
        a) a first time slot bus and a secnd time slot bus, said first and second time slot bus selectively connected to one of four DS1 frames by selector;
        b) means for controlling the selector based in a time slot map;
        c) means for fromatting the data on the DS1 frames;
        d) means for framing the data; and
        e) means for multiplexing the plurality of DS1 frames onto a SONET virtual tributary group;
    said intergrated telecommunications network further comprising:
    means for combining the ATM digital video and/or data signal with the SONET virtual tributary group to create a combined signal; and
    means for transmitting the combined signal to a customer premise equipment.

12. The network of claim 1, wherein said means for transmitting a plurality of synchronous time slots consists of a plurality of DS0 links from one or more switching systems.

13. The network of claim 12, wherein said switching system is connected to other switching systems in a public switched network for transmitting voice and data though the network.

14. The network of claim 11, wherein said plurality of time slots include 768 16-bit time slots and said plurality of DS1 frames includes four DS1 frames having 96 8-bit time slots.

15. The network of claim 11, wherein said means for formatting includes a means for buffering said time slots.

16. The network of claim 11, wherein said data is formatted into the ANSO T1 DS1 format.

17. A method for converting synchronus digital signal carriers into a combined signal comprising an asynchronous transfer mode signal and a SONET virtual tributary group, comprising the steps of:
    transmitting an asynchronous transfer mode (ATM) digital signal from a source;
    transmitting a plurality of synchronous time slots carrying data from a switching system;
    selecting time slots from either a first or second bus and transferring said time slots to one of a plurality of DS1 frames based on a time slot map;
    multiplexing the plurality of DS1 frames onto a SONET virtual tributary group;

combining the ATM digital with the SONET virtual tributary group to create a combined signal; and transmitting the combined of signal.

18. The method of claim 17, wherein said step transferring the synchronous time slots into one of a plurality of DS1 frames further comprises the steps of:

formatting the data on the DS1 frames; and framing the data in desired format.

19. The method of claim 18, wherein said step of formatting the data on the DS1 frames includes the step of buffering said synchronous time slots.

20. The method of claim 18, wherein the step of formatting the data on the DS1 frames includes the step of formatting the data into the ANSI T1 DS1 format.

21. The method of claim 18, wherein the step of framing includes the step of framing each DS1 frame in extended super frame format.

22. The method of claim 17, wherein said step of transmitting a plurality of synchronous time slots includes the step of transmitting 768, 16-bit time slots and said step of mapping into a plurality of DS1 frames includes the step of mapping inot four DS1 frames having 96, 8-bit time slots.

23. The method of claim 17, wherein the plurality of synchronous time slots are transmitted from a switching system over a plurality of DS0 links.

24. The method of claim 23, wherein said switching system is connected to other switching systems in a public switched network for transmitting voice.

25. The method of claim 17, wherein the step of transmitting an asynchronous transfer mode (ATM) digital signal from a source includes the step of transmitting an asynchronous transfer mode (ATM) digital video signal and the step of combining the ATM digital signal with the SONET virtual tributary group includes combining the ATM digital video signak with the SONET virtual tributary group.

26. The method of claim 17, wherein the step of transmitting an asynchronous transfer mode (ATM) digital signal from a source includes the step of transmitting an asynchronous transfer mode (ATM) digital data signal and the step of combining the ATM digital signal with the SONET virtual tributary group includes combining the ATM digital data signal with the SONET virtual tributary group.

27. The method of claim 17, wherein the step of transmitting an asynchronous transfer mode (ATM) digital signal from a source includes the stpe of transmitting an asynchronous transfer mode (ATM) digital video and data signal and the step of combining the ATM digital signal with the SONET virtual group includes combining the ATM digital video and data signal with the SONET virtual tributary group.

28. The method of claim 17, wherein the step of transmitting a plurality of synchronous time slots carrying data includes transmitting a plurality of synchronous time slots carrying voice and data.

* * * * *